(12) United States Patent
Frederick et al.

(10) Patent No.: US 10,829,330 B1
(45) Date of Patent: Nov. 10, 2020

(54) WRAPPING MATERIAL ROLL TENSIONER

(71) Applicant: SOURCE UNLIMITED, LLC, Lebanon, NJ (US)

(72) Inventors: Michael A. Frederick, Lebanon, NJ (US); John F. Abreu, Jackson, NJ (US)

(73) Assignee: SOURCE UNLIMITED, LLC, Lebanon, NJ (US)

(*) Notice: Subject to any disclaimer, the term of this patent is extended or adjusted under 35 U.S.C. 154(b) by 0 days.

(21) Appl. No.: 16/910,181

(22) Filed: Jun. 24, 2020

Related U.S. Application Data

(62) Division of application No. 15/657,118, filed on Jul. 22, 2017, now Pat. No. 10,717,620.

(51) Int. Cl.
*B65H 23/08* (2006.01)
*B65H 16/00* (2006.01)
(Continued)

(52) U.S. Cl.
CPC ............. *B65H 23/085* (2013.01); *B65D 5/00* (2013.01); *B65D 85/671* (2013.01);
(Continued)

(58) Field of Classification Search
CPC .... B65H 23/085; B65H 23/08; B65H 16/005; B65H 23/06; B65H 27/1944;
(Continued)

(56) References Cited

U.S. PATENT DOCUMENTS

| | | |
|---|---|---|
| 1,807,274 A | 5/1931 | Beidler |
| 2,276,590 A | 3/1942 | Petskeyes et al. |

(Continued)

FOREIGN PATENT DOCUMENTS

| | | |
|---|---|---|
| EP | 0358477 A2 | 3/1990 |
| GB | WO2003099693 A1 | 12/2003 |

OTHER PUBLICATIONS

Internet Publication—Aluminum Foil Dispense—found at: https://www.organizeit.com/aluminumfoil-dispenser.asp.

*Primary Examiner* — William A. Rivera
(74) *Attorney, Agent, or Firm* — Ernest D. Buff & Associates, LLC; Ernest D. Buff

(57) ABSTRACT

A roll tensioner for use in maintaining a wrapping material cut edge of a wrapping material retained on a wrapping material roll located within a wrapping material box having an interior cavity with an interior front wall with a top cutting edge. The roll tensioner comprises a thin, flexible main body having distal and proximal end sections separated by a spring back reversion section, and formed having a first side and a second side. Attachment means, preferably an adhesive, is located on at least a portion of the proximal end section on the first side adapted to attach the proximal end section to the interior front wall of the wrapping material box. The spring back reversion section is composed of a material that has an immediate elastic response to a static load and is capable of substantially full recovery when the static load is removed. The distal end mechanically bends downward by way of the spring back reversion section in the interior cavity of the wrapping material box. The distal end section is adapted to rest against the wrapping material proximal to the wrapping material cut edge to retain the wrapping material cut edge in an upward, substantially parallel position to the interior front wall of the wrapping material box for easy grasping of the wrapping material cut edge by an end user.

10 Claims, 10 Drawing Sheets

(51) Int. Cl.
  *B65D 85/671* (2006.01)
  *B65D 5/00* (2006.01)
  *B65H 23/06* (2006.01)
  *B65D 83/08* (2006.01)
(52) U.S. Cl.
  CPC .......... *B65H 16/005* (2013.01); *B65H 23/06* (2013.01); *B65H 23/08* (2013.01); *B65D 83/0882* (2013.01); *B65H 2402/41* (2013.01); *B65H 2402/442* (2013.01); *B65H 2402/5441* (2013.01); *B65H 2701/1842* (2013.01); *B65H 2701/1944* (2013.01)
(58) Field of Classification Search
  CPC ...... B65H 2701/1842; B65H 2402/442; B65H 2402/41; B65H 2402/5441; B65D 85/671; B65D 5/00; B65D 83/0882
  See application file for complete search history.

(56) References Cited

U.S. PATENT DOCUMENTS

| | | | |
|---|---|---|---|
| 2,326,220 A | 8/1943 | Henning et al. | |
| 2,589,587 A * | 3/1952 | Weaklend | B65H 35/0006 225/43 |
| 2,752,106 A | 6/1956 | Thompson | |
| 2,816,655 A | 12/1957 | Crozier et al. | |
| 2,890,822 A * | 6/1959 | Lee | B65D 83/0841 225/51 |
| 2,936,936 A | 5/1960 | Sano | |
| 3,173,590 A * | 3/1965 | Bahnsen | A47K 10/32 225/33 |
| 3,232,505 A * | 2/1966 | Wyant | B65H 35/0006 225/18 |
| 3,709,445 A | 9/1973 | Adams | |
| 3,870,212 A | 3/1975 | Polk | |
| 3,949,947 A | 4/1976 | Youngquist | |
| 4,196,647 A | 4/1980 | Fish | |
| 4,231,560 A | 11/1980 | Stohlquist | |
| 4,285,474 A | 8/1981 | Perez | |
| 4,787,543 A | 11/1988 | Fabo | |
| 4,832,271 A | 5/1989 | Geleziunas | |
| 4,840,299 A | 6/1989 | Burns | |
| 4,998,655 A | 3/1991 | Huang | |
| 6,716,317 B2 | 4/2004 | Gafner et al. | |
| 6,725,753 B2 | 4/2004 | Bell | |
| 8,733,218 B2 | 5/2014 | Hansen et al. | |
| 9,284,085 B2 | 3/2016 | Pace | |
| 9,918,598 B2 | 3/2018 | Osbone | |
| 10,202,255 B2 | 2/2019 | Sabol | |
| 10,717,620 B2 * | 7/2020 | Frederick | B65H 16/005 |
| 2008/0127791 A1 | 6/2008 | Benedetti et al. | |
| 2011/0108599 A1 | 5/2011 | Nottingham | |
| 2011/0147254 A1 | 6/2011 | Pierron | |

* cited by examiner

[ PRIOR ART ]

WRAPPING MATERIAL ROLL TENSIONER

CROSS-REFERENCE TO RELATED APPLICATIONS

This application is a divisional of applicant's co-pending U.S. patent application Ser. No. 15/617,118 filed Jul. 22, 2017 entitled "Wrapping Material Roll Tensioner", the disclosure of which is hereby incorporated in its entirety by reference thereto.

FIELD OF THE INVENTION

The present disclosure generally relates to roll tensioner devices for spooled wrapping materials; and more particularly to wrapping material roll tensioners for barrier wrappings, or packaging wrap that is spooled onto a tube or core.

DESCRIPTION OF THE PRIOR ART

Barrier wrappings, packaging wrap that is spooled onto a tube or core, typically composed of cardboard or other fiber materials, have a plethora of applications, including food coverings and other wrapping materials which cover, wrap, contain, store or preserve goods. These wrapping materials include, for non-limiting example, aluminum foil, wax paper, freezer paper, parchment paper, deli wrap, paperboard (cardboard) produced from chemical pulp produced in the Kraft process (Kraft paper), as well as other similar materials in both gauge and weight, which are spooled onto a tube or core in a similar manner. Such wrapping materials are arranged on the tube or core and as the user utilizes the wrapping material the material is unrolled or unspooled and cut along a metal cutter strip. When the section is removed or cut from the wrapping material spool the remaining wrapping material edge drops down to the bottom of the box containing the wrapping material spool. As a result, the wrapping material becomes crinkled and disheveled, and the user must struggle to find and grab the material edge with his/her fingers. Often, the user's fingers or hands inadvertently contact the metal cutter strip, which causes scratching, abrasions and/or cuts on the fingers or hands. This problem is especially prevalent with aluminum foils and some papers where instances of both paper cuts to fingers, from the sharp edge of a foil or paper sheet as well as abrasions to the back of hand from the metal cutter, frequently occur. Heretofore disclosed and/or utilized tensioner and/or barrier wrapper devices fail to provide a cost effective solution to this everyday problem experienced by consumers.

Examples of various tensioner and/or barrier wrapper devices are set forth summarily below:

U.S. Pat. No. 2,276,590 to Petskeyes et al. discloses a paper holding and tensioning means generally constructed having a holding bail which cooperates with an article elevator to hold one end of a piece of wrapping paper while the elevator is reciprocated in wrapping operation. The holding means is arranged and constructed to release and reengage the wrapping paper at the completion of the reciprocation or elevating cycle of the elevator. Paper on an article is tensioned while being wrapped or substantially wrapped as a result of the reciprocating movement of the elevator.

U.S. Pat. No. 2,326,220 to Henning et al. discloses a tensioning apparatus for maintaining the desired tension in an element being applied to a second element. In accordance with one embodiment of the invention, an apparatus is provided for maintaining constant tension in a web being wound from a pad or roll mounted concentrically of a constantly advancing cable onto said cable. The constant tension is effected by utilizing the speed-torque characteristic of an induction type torque motor to apply, through a-planetary differential mechanism, a torque tending to rotate a spider on which the feed pad or roll is mounted in a direction opposite to the direction in which the motor which supplies power to advance the cable also tends to drive the pad through the differential mechanism.

U.S. Pat. No. 4,231,560 to Stohlquist discloses a tension controlled apparatus for feeding web material from a supply source to processing equipment of the type that exerts a pulling force on the web. The apparatus includes a drive wheel and a driven wheel mounted for rotation about an axis parallel to the drive wheel and for shifting movement toward and away from the drive wheel. A web feed roller is connected coaxially to the driven wheel for rotation thereby. Means are provided for guiding the web material to cause it to wrap part way around the web feed roller as it passes from the supply source to the processing equipment. The web material exits from the web feed roller in an exiting direction having a substantial component in a direction to shift the driven wheel into driving engagement with the drive wheel in response to tension applied by the processing machine on the web of material exiting from the feed roller.

U.S. Pat. No. 3,870,212 to Polk discloses a dispenser-holder of simple construction for foils which come packaged in a box of substantially square cross-section. The dispenser-holder is adapted to receive and hold the box. The holder has a rigid ledge with a cutting edge so that the foil may be unrolled from the box and cut to the desired size with one hand. After cutting, a protruding edge of the foil remains on the roll, and extends over the rigid ledge so that the next sheet is readily obtained therefrom.

U.S. Pat. No. 6,716,317 to Gafner et al. discloses a tension decurler for web material. The material is decurled by controlling web tension as well as the angle of wrap on a decurler roll and a cooperating pivot roll, all without affecting web tension in the downstream web converting process. An upstream brake roll and a downstream pull roll control web tension within the decurler apparatus and independent decurler rolls are provided for removing up-curl and down-curl.

U.S. Pat. No. 8,733,218 to Hansen et al. discloses an apparatus for dispensing sheet material from a sheet material dispenser. Dispenser embodiments include drive and tension rollers supported within a housing forming a nip therebetween. Pulling of sheet material through the nip and against the drive roller rotates the drive roller. Dispenser embodiments may include a cutting mechanism powered by drive roller rotation with an improved carrier-supported blade permitting highly-efficient dispenser operation. Dispenser embodiments may include a sheet material tail length adjuster which permits the attendant to shorten or lengthen the tail length extending away from the dispenser. Dispenser embodiments may further include a sheet material conservation feature which imposes a delay between dispense cycles, encouraging use of a single sheet of material and discouraging sheet material waste.

U.S. Pat. No. 9,284,085 to Pace discloses a device for holding and handling a roll of wrapping material. The device has a tube handle, a tube extension adjustably connected to the tube handle, a top end cap on the tube handle, a bottom end cap on the tube extension, and a tensioning means, wherein the bottom end cap releasably holds the roll of wrapping material on the tube extension against the tensioning means. The tensioning means is adjustable while the device is in use, applying wrapping material to an item to be wrapped.

U.S. Patent Application No. 2008/0127791 to Benedetti et al. discloses a film dispenser comprising a housing adapted to receive and hold a roll of film. The dispenser has a dispensing opening through which a layer of film may pass. In addition, the dispenser is provided with a movable cutting unit having a blade mounted therein. The dispenser further comprises a cutting channel shaped and positioned to receive the blade. It is preferred that the dispenser has means to maintain tension in the film as it is cut.

U.S. Patent Application No. 2011/0147254 to Pierron discloses a foil packaging for soft food masses. A container film shape is formed into the shape of an open container and a lidding film is sealed onto the container film closing the container with a lid. The container film and lidding film are multi-layered. One of the layers is an aluminum foil, which is optionally pre-lacquered and if desired printed on and lacquer-coated on one side. The aluminum foil of the container film and the lidding film is coated with a polymer, and a hot-sealing lacquer is provided on the polymer layer of the container film. The polymer, optionally coated with hot-sealing lacquer, may be situated on the sealing side of the aluminum foil of the lidding film, and a corrosion protection layer, if desired in the form of a polymer, is provided on the other side of the aluminum foil. Alternatively, the aluminum foil of the lidding film may be coated on the sealing side with hot-sealing lacquer and the polymer layer, optionally coated with hot-sealing lacquer, is situated on the other side of the aluminum foil.

Foreign Patent Application No. WO/2003/099693 to Benedetti et al. discloses a film dispenser (10) comprising a housing (12) adapted to receive and hold a roll of film (14) and having a dispensing opening (50) through which a layer of film may pass. The dispenser is provided with a movable cutting unit having a blade (30) mounted therein. The dispenser (10) further comprises a cutting channel (26) shaped and positioned to receive said blade (30). It is preferred that the dispenser (10) have means to maintain tension in the film as it is cut.

Foreign Patent Application No. EP0358477 to Asbury et al. discloses a tape dispenser including an automatic tension control mechanism and provision for auto-splicing the tail portion of one tape to the leading portion of another. The tensioning mechanism includes a brake band that extends at least partially about a tape spindle and is tensioned in response to the position of a spring-biased tensioning roller over which the tape is routed.

Internet Publication "*Aluminum Foil Dispenser*" found at http://www.organizeit.com/aluminum-foil-dispenser.asp discloses an aluminum foil dispenser having a magnetic lid and slide cutter that allows the user to cut a desired portion of aluminum foil. The dispenser can be refilled with store-bought rolls of aluminum foil or wax paper for reuse.

Despite the aforementioned tensioner and/or barrier wrapper devices, problems in barrier wrapper roll edge tension and deformation still exist. For example, current tensioner and/or barrier wrapper devices do not provide a mechanical device that provides a cost effective way to prevent the roll edge of a barrier wrapper roll, such as aluminum foil, wax paper, parchment paper, etc., from falling below the roll, thereby causing it to deform and become difficult to grasp when used.

Accordingly, there exists a need in the art for a device that maintains the position of the material edge at or near the top of the box side wall so that an end user can readily grab the material end without having to reach within the box and risk disheveling the wrapping material and/or injuring his/her fingers or hands.

SUMMARY OF THE INVENTION

The present invention provides a wrapping material roll tensioner for barrier wrappings, or packaging wrap that is spooled onto a tube or core, typically composed of cardboard, a fibrous material, and/or a polymeric material. The subject roll tensioner provides an economical, novel approach that addresses problems in the art associated with slippage and maintenance of the cut edge of a wrapping material roll. Providing an improvement in the packaging wrap art, the roll tensioner is directed to a device that maintains the cut area of the wrapping upward and away from the front wall of the box, thereby creating a gap between the front wall of the box and the roll of wrapping material, or in some instances, above the metal cutter strip, thereby preventing the remaining wrapping end from dropping down to the bottom of the box after each use of the wrapping material. Prevention of the wrapping material edge from dropping down to the bottom of the box results in an easily accessible edge for the user to grab without needing to search around the bottom of the box, struggling with wrapping material. Wrapping material is readily accessed and advanced, and cuts and scrapes to the hand and fingers are mitigated. The term wrapping material as used herein refers generally, but non-limiting, to plastic wrap, wrapping paper, aluminum foil, wax paper, freezer paper, parchment paper, deli wrap, paperboard (cardboard) produced from chemical pulp produced in process such as the Kraft process (for example sold under the trade name Kraft paper), as well as other similar materials in both gauge and weight.

In a first embodiment, there is provided a roll tensioner for use in maintaining a wrapping material cut edge of a wrapping material retained on a wrapping material roll. The wrapping material roll is located within a wrapping material box having an interior cavity with an interior front wall with a top cutting edge. The roll tensioner comprises a thin, flexible main body having distal and proximal end sections separated by a spring back reversion section, and formed having a first side and a second side. Attachment means, preferably an adhesive, is located on at least a portion of the proximal end section on the first side adapted to attach the proximal end section to the interior front wall of the wrapping material box. A spring back reversion section is composed of a material that has an immediate elastic response to a static load and is capable of full recovery immediately when the static load is removed. The distal end mechanically bends downwardly owing to the spring back reversion section in the interior cavity of the wrapping material box. The distal end section is adapted to rest against the wrapping material proximal to the wrapping material cut edge to retain the wrapping material cut edge in an upward, substantially parallel position to the interior front wall of the wrapping material box for easy grasping of the wrapping material cut edge by an end user.

In another aspect of the invention, a roll tensioner is provided for use in maintaining a wrapping material cut edge of a wrapping material retained on a wrapping material roll located within a wrapping material box having an interior cavity with an interior front wall having a top cutting edge. The roll tensioner comprises a thin, flexible main body having distal and proximal end sections separated by a spring back reversion section, and formed having a first side and a second side. The proximal end section comprises opposing bottom tabs adapted to mate with slots located within a wall of said wrapping material box to secure said roll tensioner in place therein, and wherein said distal end comprises opposing top tabs forming a "T" shaped distal end section. The spring back reversion section is composed of a material that has an immediate elastic response to a static load and is capable of full recovery substantially immediately when said static load is removed. The distal end mechanically bends downwardly owing to said spring back reversion section in said interior cavity of said wrapping material box. The distal end section is adapted to rest against said wrapping material proximal to said wrapping material cut edge to retain said wrapping material cut edge in an upward, substantially parallel position to said interior front wall of said wrapping material box for easy grasping of said wrapping material cut edge by an end user.

Also provided is a method of using a roll tensioner that maintains the cut edge of wrapping material retained on a wrapping material roll located within a wrapping material box having an interior cavity with an interior front wall having a top cutting edge, comprising the first step of placing the roll tensioner within the interior cavity of the wrapping material box, the roll tensioner comprising: (i) a thin, flexible main body having distal and proximal end sections separated by a spring back reversion section, and formed having a first side and a second side; (ii) the spring back reversion section being composed of a material that has an immediate elastic response to a static load and being capable of full recovery immediately when the static load is removed. In the second step, the roll tensioner is attached to the first side of the proximal end section to the interior front wall of the wrapping material box proximal to the top cutting edge of the wrapping material box. The distal end mechanically bends downward by way of the spring back reversion section in the interior cavity of the wrapping material box. The distal end section is adapted to rest against the wrapping material and below the cut edge to retain the wrapping material cut edge in an upward position substantially parallel to the interior front wall of the wrapping material box to facilitate grasping of the wrapping material cut edge by an end user.

BRIEF DESCRIPTION OF THE DRAWINGS

The invention will be more fully understood and further advantages will become apparent when reference is had to the following detailed description of the preferred embodiments of the invention and the accompanying drawings, in which:

FIG. 3b illustrates a top plan view of the roll tensioner of FIG. 3a;

FIG. 3c illustrates side plan view of the roll tensioner of FIG. 3a;

DETAILED DESCRIPTION OF THE DISCLOSURE

Figure 1:
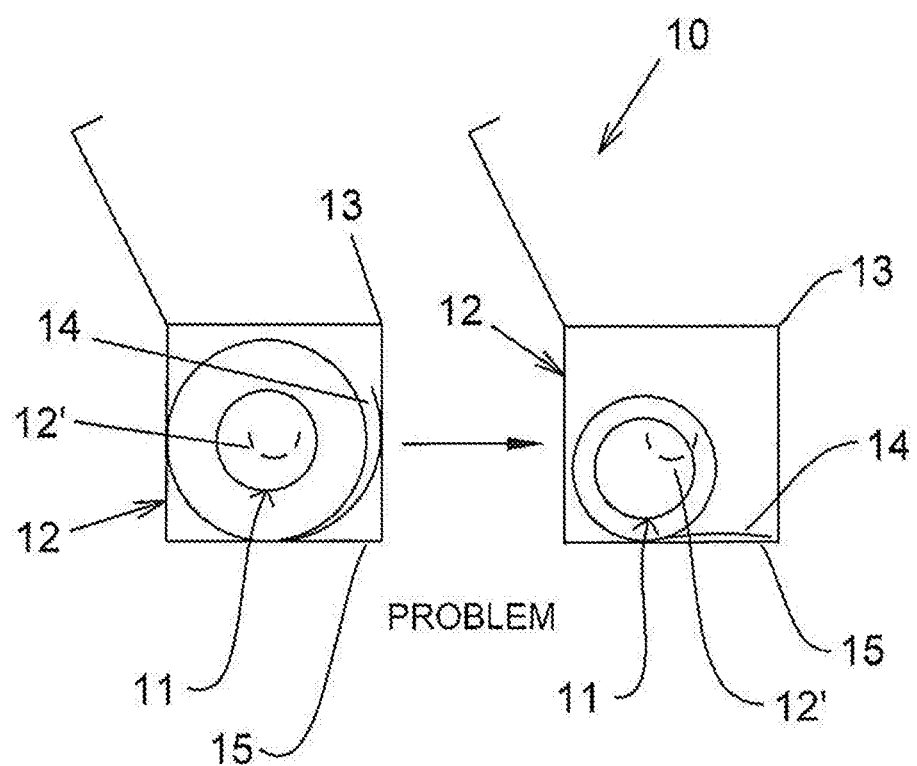
FIG. 1 illustrates a side plan view depicting the problem in the prior art which the subject roll tensioner solves.

The best mode for carrying out the present disclosure is presented in terms of the embodiments herein. The embodiments described herein comprise detail used for illustrative purposes and are subject to many variations. It is understood that various omissions and substitutions of equivalents are contemplated, as circumstances may suggest or render expedient, but are intended to cover the application or implementation without departing from the spirit or scope of the present disclosure. Further, it is to be understood that the phraseology and terminology employed herein are for the purpose of the description and should not be regarded as limiting. The headings utilized within the description are for convenience only and have no legal or limiting effect.

The subject invention is directed to an improvement in the packaging wrap art by providing a roll tensioner device that maintains the cut area of the wrapping parallel with, or in some instances, above the metal cutter strip. The subject roll tensioner prevents the remaining wrapping end from dropping down to the bottom of the box after each use of the wrapping material. By preventing the wrapping material edge from dropping down to the bottom of the box, the user no longer needs to search around the bottom of the box struggling to grab the edge of the wrapping. Cuts, scrapes and abrasions to the hand and fingers are thereby prevented, and the integrity of the wrapping material is maintained. While preventing injury to the hand/fingers and maintaining the integrity of the wrapping material, the subject roll tensioner does not interfere or obstruct a normal customer use in any way. The roll tensioner is appointed to be installed to the inside/center front wall of the box in an inconspicuous position. This allows the end user to effortlessly grip onto the wrapping, regardless of left or right handed use. A space is created between the wrapping material and the metal cutter that allows the user to hold onto the wrapping and pull out the desired length. Once the desired length is removed, the wrapping can be cut in the usual way, and the wrapping edge will stay held up near the cutter and ready for the next use.

Packaging of the roll tensioners may be accomplished by randomly placing loose parts into a cardboard box for bulk shipments. Parts may be easily removed from the box as needed using this method. Alternately, the roll tensioners, while still attached to main carrier, may be spooled onto a core (into a roll shape) for automated or semi-automated dispensing. Either way, boxes may be shrink wrapped, placed on a standard pallet and bulk shipped to the intended destination via standard shipping methods.

The roll tensioner can be installed in at least two different ways, depending on the desired distribution method. Automated manufacturing methods can vary; however, a first option entails installing the part mechanically, from a spool, in an automated way, at the time of wrapping material manufacture. Installation should occur prior to placing the wrapping roll into the packaging box. This will allow automation which is critical to any fast pace modern manufacturing line. The roll tensioner can be attached to the inside of the box (first having the backer removed from the adhesive tape already on the part); the roll tensioner is mechanically bent over as the wrapping roll is placed into the box, setting the tensioner into the correct position. The box would then be closed and sealed as in the conventional manner. No changes would be required to current shipping procedures. The second method, applicable when wrapping material is sold at retail or directly to an end user, provides for the end user to open the box and remove the wrapping roll. The end user then peels off the adhesive backer from the roll tensioner with his/her fingers and places the adhesive (sticky side) portion of the tensioner firmly against the inside, front and center of the box. At this point, the top of the tensioner protrudes up beyond the top inside edge of the box (above the metal cutter strip). Taking the wrapping roll in hand, the end user pushes the wrapping roll against the tensioner as he/she places the roll into the box making sure the roll tensioner gently bends over into an upside down "u" shape (see FIGS. 1 and 2a) while being careful not to crease or rupture the roll tensioner. If the roll tensioner creases or ruptures while bending, it will no longer operate correctly.

Costs associated with the subject roll tensioner generally depend on the method of manufacture, the number of parts per foot, rate (speed) and fluctuating raw material prices. The material used to form the roll tensioner may be FDA compliant, if required for food product use. Some methods can reuse a percentage of recycled material in the raw material mixture which will affect the material costs as well. If tooling already exists for the shape required, there would be less up-front investment cost. This translates into less risk. A new product idea could be brought to market with low risk and rapidly due to an inexpensive part cost and low up-front investment cost. This would be a low cost improvement to packaging that adds value and ease of use. The roll tensioner would be a desirable benefit to the end user or customer. The roll tensioner would be a marketing option and sales tool that would provide product differentiation, and unique packaging that stand out with respect to other wrapping material containers using standard packaging. There is also a safety concern for wrapping material manufacturers to consider, as mentioned above. While using conventional wrapping packages, cuts, scrapes or abrasions to the hands and fingers are significantly reduced, since the user no longer needing to search around the bottom of the box, struggling to grab the edge of the wrapping material. These structural and functional features, and the advantages they afford provide valuable marketing themes for the manufacturer.

FIG. 1 illustrates a side plan view depicting a troublesome problem with conventional wrapping material containers, shown generally at 10, which is solved by the subject roll tensioner. After a section of the wrapping material is removed or cut from the wrapping material roll 11 in box 12 via metal cutter strip 13 the remaining wrapping material end 14 drops to the bottom 15 of the box 12. As a result, the end user must reach his/her fingers down into the box 12 to retrieve the wrapping material end 14 before next using the wrapping material. When doing so, the end user's fingers are subject to cuts or injury from the remaining wrapping material end 14, or from the metal cutter strip 13. In order to remedy this problem and provide a solution in the art and an improvement of wrapping material boxes, the subject roll tensioner is provided.

The conventional box 12 (frequently household cardboard cutter box style dispensers) typically contains perforated tabs 12' on each end that are appointed to be dented inward by the end user to retain the wrapping material roll within the box 12. Tabs 12' are designed to prevent the roll from pulling out of the box, but the tabs 12' do not prevent the material roll from sliding to and fro in the box. Nor do tabs 12' control the rolling of the material roll. Because the standard box tabs 12' push in from the bottom (e.g. perforated "U" shape tab), not the top, they "give" and allow the roll to slide back and forth inside the box. This problem becomes more evident as the roll diminishes in diameter. The original problem attending maintenance of an easily accessible cutting edge of the wrapping material still exists whether tabs 12' are used or not. The tabs 12' do not prevent the wrapping material roll from sliding to the back of the box, as shown for example in FIG. 1. Tabs 12' only prevent the wrapping material roll from being pulled up and out of the box as the material is removed from the roll.

These tabs are typically in conventional household cardboard cutter box style dispensers, while commercial cardboard cutter box style dispensers are generally more sophisticated. As an example See: https://www.webstaurantstore.com/choice-18-x-500-food-service-standard-aluminum-foil-roll/12218X5ST.html. Typically, a commercial cardboard cutter box style packaging is marketed toward commercial kitchens and the wrapping material roll in this example is positioned in the box opposite of household boxes. This would appear to still have a problem, just in the opposite direction as the roll diminishes in diameter. So, the subject tensioner could be installed on the back wall if wrapping is installed in the opposite position.

Figure 2A:
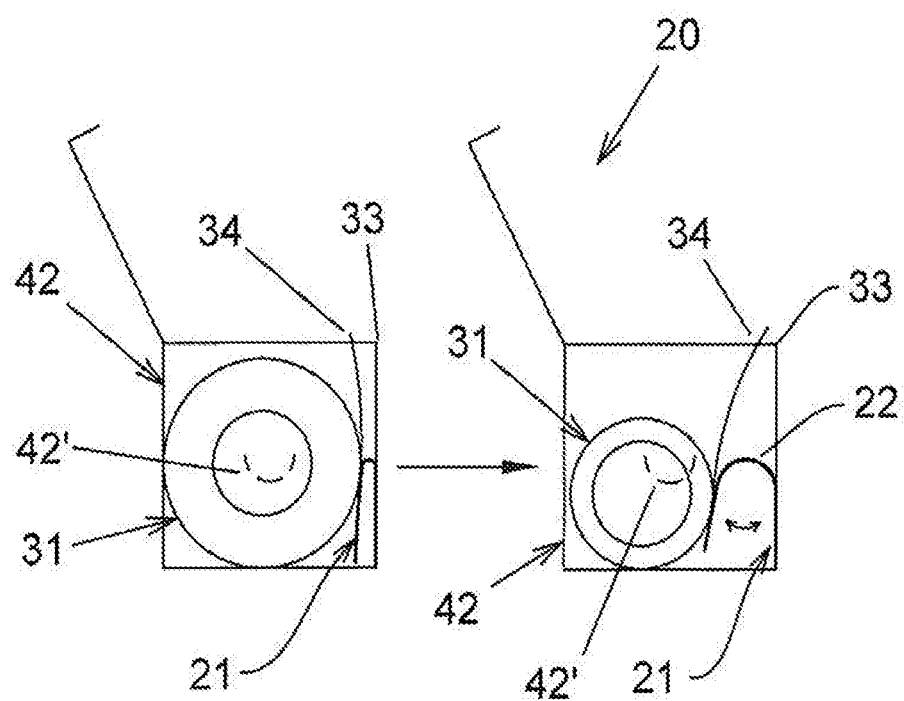
FIG. 2a illustrates a side plan view of the subject roll tensioner which solves the problem in the art.

FIG. 2a illustrates a side plan view of the subject roll tensioner, shown generally at 20, which solves the aforesaid problem in the art. As shown in FIG. 2a, in operation the subject roll tensioner 21 works by employing a gentle bend under constant tension (shown at 22), against a wrapping material end 34 positioned within a box 42. Box 42 typically contains perforated tabs 42' appointed to be dented inward by the end user to prevent the roll from pulling out of the box. The tabs 42' do not prevent the wrapping material roll from sliding to the back of the box, as shown for example in FIG. 2a. Tabs 42' only prevent the wrapping material roll from being pulled up and out of the box as the material is removed from the roll. As the overall diameter of the wrapping material roll 31 diminishes over time, the subject roll tensioner 21 gentle bend continues to assert tension 22 on the roll 31, thereby maintaining the wrapping material end 34 upward and away from the front wall of the box, thereby creating a gap between the front wall of the box 42 and the roll of wrapping material.

This maintains the cut area/wrapping material end 34 of the wrapping material 31 parallel with, or in some instances, above the metal cutter strip 33. The roll tensioner 21 will not allow the remaining wrapping end 34 to drop down to the bottom of the box 42 after each use. By preventing the wrapper end 34 from dropping down to the bottom of the box 42 the user no longer will need to search around the bottom of the box 42 struggling to grab the edge of the wrapping material end 34, thereby avoiding cuts, scrapes and abrasions to the hand and fingers.

Figure 2B:
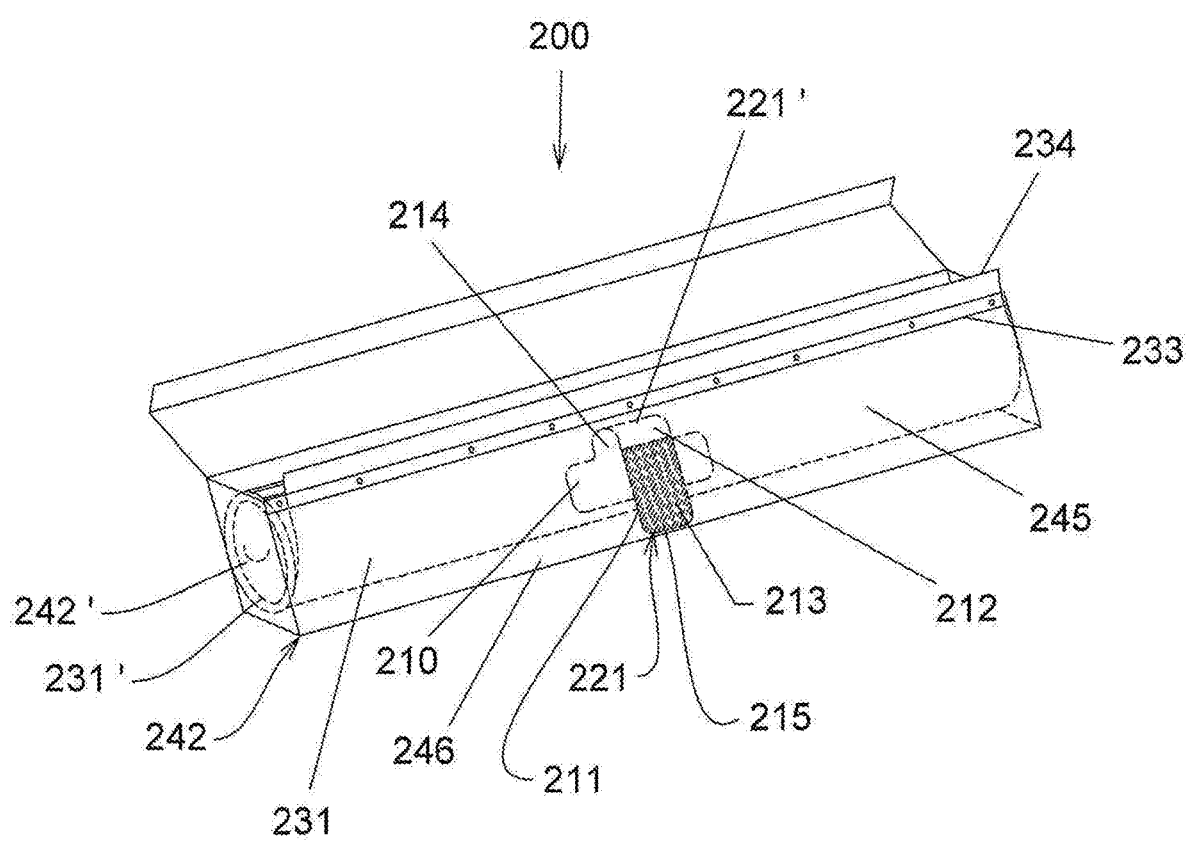
FIG. 2b illustrates a top plan view of a conventional household wrapping material box with an embodiment of the subject roll tensioner inserted therein.
Figure 3A:
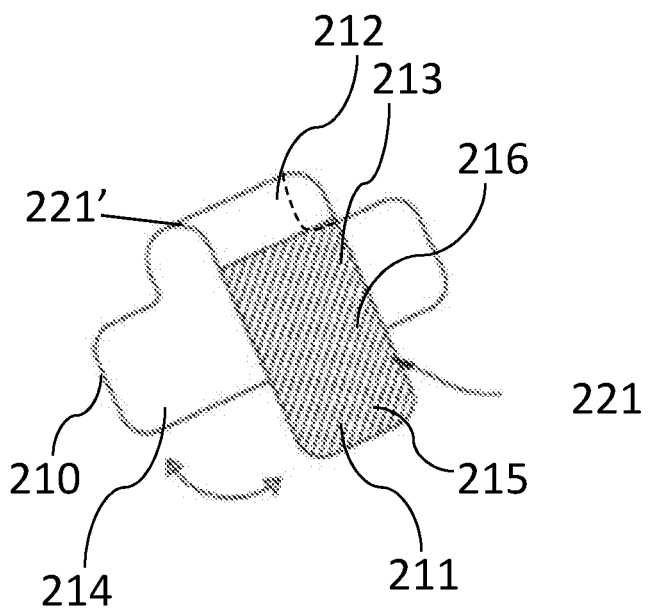
FIG. 3a illustrates a top side view of the roll tensioner of FIG. 2a-2b, showing the roll tensioner in a reversion or spring back configuration.
Figure 3B:
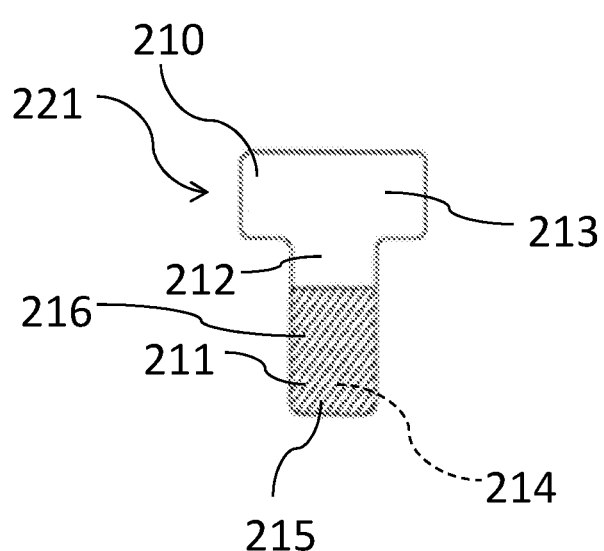
Figure 3C:
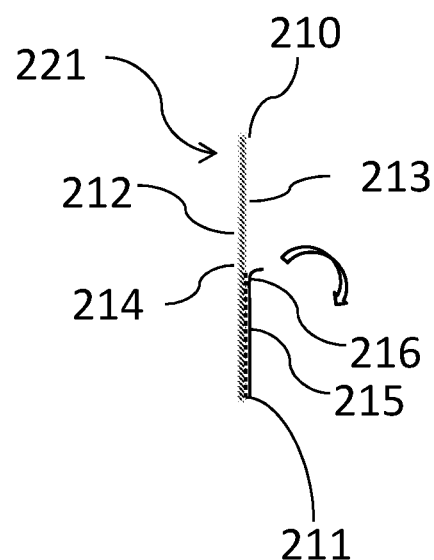

FIG. 2b illustrates a top plan view of a conventional household wrapping material box, shown generally at 200, with the roll tensioner embodiment of FIG. 2a inserted therein. FIGS. 3a-3c illustrate top side, top plan and side views of the roll tensioner of FIGS. 2a-2b, showing the roll tensioner in a reversion or spring back and flat configurations, respectfully. An embodiment of a roll tensioner 221 of the subject invention is attached within a conventional household wrapping material box 242 (such as standard cardboard or other types of containers, including re-usable polymeric, aluminum or metal boxes are contemplated for housing a wrapping material roll). This conventional box 242 acts as packaging, as well as a dispenser for a wrapping material roll having a wrapping material 231 spooled on a tube (or core) 231'. A non-limiting example would be an aluminum foil cardboard box purchased at a retail grocery store. A household consumer would use the wrapping material as needed, while the remaining wrapping material is stored in the same box (or packaging/dispenser) for future use. The box 242 can be continually used for both storage, as well as a dispenser, until the entire roll of wrapping material 231 is depleted. At which time the box 242 would be discarded or recycled. The conventional box 242/packaging/dispenser, often contains an attached metal strip 233 (metal cutter strip) with a jagged edge. The purpose of the metal cutter strip 233 is to allow the user to cut the wrapping material 231 in a straight line, away from the remaining portion of the roll, to the length required by the user yielding a wrapping material end 234. The conventional household box 242 also contains perforated tabs 242' on each end of the box 242 which can be used by the end user, to retain the wrapping material roll within the box 242. It is noted that tabs 242' prevent the wrapping material roll from being removed from the box. However the tabs 242' do not restrict to and fro movement of the wrapping material roll within the box 242. This can be accomplished by the user pressing the tabs from the outside-in on each end, taking care to make sure the tab extends into the inside diameter of the tube (or core) 231' of the wrapping material 231 spool. Often people are unaware that these tabs 242' are part of the cardboard box 242 and, in any event, their presence does not affect the use of the wrapping material 231. The subject roll tensioner 221 is designed to work either way, with or without, the box 242 tabs 242' being utilized.

Commercial wrapping or foil dispensers (permanent dispensers) do exist and are a separately purchased item from the conventional cardboard household consumer packaging. Examples of permanent dispensers can be found for example at: https://www.webstaurantstore.com/edlund-ffd-18-stainless-steel-film-and-foil-dispenser-cutter-for-12-and-18-rolls/333FFD18.html?utm_source=Google&utm_medium=cpc&utm_campaign=GoogleShopping&gclid=CIK98b6-y0dQCFY1LDQodiqoG7Q and also: https://www.webstaurantstore.com/tablecraft-kk3-kenkut-3-12-18-film-and-foil-dispenser-cutter/808KK3.html However, for the household consumer, a separate dispenser would require an additional monetary investment beyond the purchase price of the wrapping alone. The regular household consumer would also need additional space to store the purchased dispenser. That additional storage space would either take up valuable counter space, wall space or cabinet volume. Both constitute precious real estate in most home kitchens. Marketing of these types of dispensers is generally directed toward commercial kitchen use. In any event, the subject tensioner, optionally, can be used in a permanent dispenser or a commercial size cardboard cutter box, as well as a household conventional dispenser (as discussed above).

Preferably, the roll tensioner 221 is composed of a thin, flexible clear material, such as Polyvinyl Chloride (PVC), and has a thickness of about 0.015 inches. Roll tensioner 221 is constructed having distal and proximal end sections, 210 and 211, separated by a spring back/reversion section 212, and formed having a first side 213 and a second side 214. A thin, flexible, pressure sensitive, permanent adhesive tape 215 with a removable backer or tab 216 (see FIGS. 3a-3c) is applied on at least a portion of the proximal end section 211 on first side 213. Distal end 210 extends downward via spring back/reversion section 212 in the interior of box 242. Proximal end section 211 is attached via adhesive tape 215 to the center of the front inside wall 245 of box 242 under and perpendicular to the metal cutter strip 233 (first having the backer 216 removed from the adhesive tape 215). Metal cutter strip 233 can be attached to both the inside and more commonly, the outside of box 242, depending on the box 242 supplier. The position of the metal strip 233 is often presented on the outside of the box, but the subject tensioner is not hindered by the metal strips location. These metal strips are quite thin and are typically installed above the operating zone of the subject roll tensioner. The roll tensioner 221 is mechanically bent over as shown at 221' owing to the spring back/reversion section 212 as the wrapping material 231 roll is placed into the box 242, setting the roll tensioner 221 into the correct position so that the wrapping material end 234 rests upward. The roll tensioner 212 holds the edge/wrapping material end 234 upward and away from the front box 242 wall 245, thereby creating a gap between the wall 245 and the roll of wrapping material end 234. This makes it easier to grab the wrapping material end 234. The term "mechanically", as referred to herein means the bending of the tensioner due to the application of force, including installation by way of: (i) a machine which mechanically bends the tensioner and is machine inserted within a box with a wrapping material roll; or (ii) by way of manual application, through a human operator physically bending the tensioner while attaching the tensioner within a box and reinserting the material wrapping roll. The length of the roll tensioner is adequate to reach the bottom corner of box 242 as shown at 246. The length of the roll tensioner preferably ranges from about 2 inches to 8 inches (depending on the box size or box material; note the tensioner can readily be cut or stamped to fit specific box sizes). The subject tensioner design can be adjusted to compensate for box construction. i.e. a rigid box might need a longer tensioner to make up for the lack of "give" in box wall.

Figure 4:
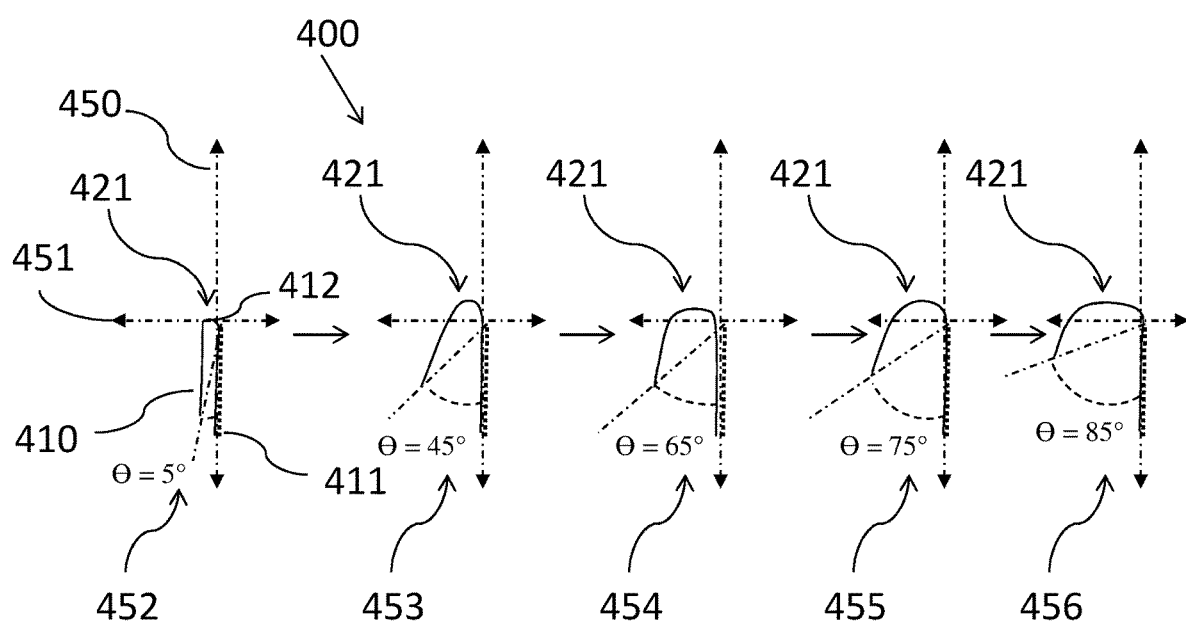
FIG. 4 illustrates reversion and flexing angles of the spring back reversion section from a vertical plane.

FIG. 4 illustrates reversion and flexing angles of the spring back reversion section from a vertical plane, shown generally at 400. The roll tensioner 421 is shown attached on a front wall of a conventional household wrapping material box via adhesive on proximal end 411. Different force and static tension are applied against the distal end 410 and spring back reversion section 412, respectively. Without being bound by theory, "tension" herein refers to a force in lbs. when a material is pulled, compression being the opposite. Static "Load", without being bound herein, would be the roll pushing up against the tensioner and compressing the tensioner. A reduction in the applied load results as the roll diameter diminishes. Herein, both situations occur in opposite directions. A "load" is being applied to the part and "spring tension" is in the opposite direction applying the stored mechanical energy as it returns to its original shape over time. For example, a spring is an elastic object used to store mechanical energy The static tension is a result of the roll of wrapping material—the more wrapping material loaded on the roll, the greater in diameter the roll is, and therefore the greater the static tension as the force pressing against the distal end 410 is greater causing the spring back reversion section 412 to be at a greater flex angle. Conversely, as the wrapping material is used off the roll and the wrapping material roll becomes reduced in diameter, the force against the distal end 410 decreases and the static tension of the spring back reversion section 412 results in a lesser flex angle. Preferably, the spring back reversion section 412 is capable of reversion and flexing at an angle $\Theta$ ranging between about 5°-85° from a vertical plane, herein shown at 450 (the horizontal plane is shown herein at 451). When the wrapping roll has a larger diameter dimension, owing to a large amount of wrapping material spooled thereon, the force against the distal section 410 is great and flex angle of the spring back reversion section 412 is less, for example $\Theta = \sim 5°$ from the vertical plane 450 and the front wall of the wrapping material box, such as shown at 452. As the wrapping material is used, the wrapping roll diameter decreases, and the force against the distal section 410 decreases, along with the flex angle of the spring back reversion section 412 angle becoming greater. For example, see $\Theta = \sim 5° \rightarrow \Theta = \sim 45° \rightarrow \Theta = \sim 65° \rightarrow \Theta = \sim 75° \rightarrow \Theta = \sim 85°$ (as when the roll is nearly empty of wrapping material), shown at 452, 453, 454, 455, and 456, respectively.

The term "reversion" as used herein refers to dimensional change in plastics products or viscoelastic materials as a consequence of "material memory". Original formed shapes of plastic products are "memorized" so that if it is subsequently distorted, it will return to its original shape. The stress/strain response for PVC (like other thermoplastic materials) is dependent on both time and temperature. As a plastic material is applied with a constant static load, there is created an immediate elastic response and the shape is fully recovered immediately when the load is removed. Additionally, a slower deformation continues while the load is applied, until rupture occurs. This is referred to as creep. Removal of the load before failure results in recovery of the original dimensions gradually over time. Temperature also influences the rate of creep and recovery. Creep rates typically increase at higher temperatures. Preferably, the roll tensioner has a "T" shape; however a rectangular shape provides another preferred shape embodiment. Other shapes that include the same structural and functional parameters are contemplated.

Preferably, the roll tensioner 221 is constructed with a smooth surface and a low coefficient of friction material, such as PVC. PVC generally shows an excellent performance under abrasive conditions. The main properties contributing to this are the low elastic modulus and coefficient of friction. This enables the material to "give" and particles tend to skid rather than abrade the surface. Materials for constructing the subject tensioner include low friction materials having flexibility properties that allow flexure of the tensioner and resiliency that provide for spring back without breakage. Representative materials include materials generally having a low coefficient of friction, such as for non-limiting example, Teflon, Nylon and Polyurethanes. Thickness of the tensioner is also a consideration when selecting materials used to construct the subject tensioner. The material forming the tensioner's spring back/reversion section should demonstrate adequate flexibility to deform elastically and return to its original shape when the applied stress (wrapping material) is removed. "Stress" is a measurement in PSI of the amount of force per area the tensioner material suffers when bent or pulled. It is also noted that the material construction of the box wherein the tensioner is mounted can have an effect on the flexibility and/or thickness of the tensioner. In cases where the box is composed of cardboard, the walls of the box may give to a degree so that the stress on the tensioner is dissipated proportionally. When the box is made of a rigid material, such as plastic or metal, the walls of the box are less likely to give and the stress on the tensioner will be greater. Thus, the tensioner material, length and/or thickness may be adjusted to counteract the material of which the box is composed.

Preferably, the subject tensioner is composed of PVC because it exhibits high hardness and mechanical properties especially well suited for its construction. The mechanical properties of rigid PVC (uPVC) are very good; the elastic modulus can reach 1500-3,000 MPa. Materials having properties similar to the empirically preferred PVC, are excellent candidates for construction of the subject tensioner. A table generally comparing mechanical properties of other materials to PVC is set forth below.

|  | TS | FS | FM | CF |
|---|---|---|---|---|
| Nylon 6 Natural | 12,500 | 15,500 | 420,000 | 0.22 |
| PET-Tecapet ® | 12,500 | 17,600 | 430,000 | 0.25 |
| PTFE | 4,000 |  | 72,000 | 0.1 |
| PVC | 7,500 | 12,800 | 481,000 | 0.3 |
| Polyester (thermoplastic) |  | 14,500 | 362,594 | 0.3 |
| Polyurethane | 6,570 | 11,800 | 390,000 | 0.7 |

TS=Tensile Strength (PSI)
FS=Flexural Strength (PSI)
FM=Flexural Modulus (PSI)
CF=Dynamic Coefficient of Friction per ASTM D3702
Found at:
http://www.plasticsintl.com/sortable_materials.php and http://www.efunda.com/materials/polymers/properties/polymer_datasheet.cfm?MajorID=P-TP&MinorID=1

The preferred range for the value of the dynamic coefficient of friction is between 0.10 and 0.30. Polyurethane has more than twice the coefficient of friction of the other materials; therefore its use in the subject tensioner spring back reversion section is limited. Relative to the Flexural Modulus, a material with at least 350,000 PSI is preferable. The flexural strength of PTFE (Teflon) ranges from 72,000 to 190,000PSI depending on the type of fill used, but is still half of the comparable values of the other contenders. Found at http://catalog.wshampshire.com/Asset/psg_teflon_ptfe.pdf. The subject tensioner is preferably composed of a PVC material or other materials having comparable properties to PVC, as the collective presence of these properties is especially well suited for construction and prolonged use of the tensioner.

Economics, however, are a major factor and PVC's performance in the context of wear rate/unit cost is excellent. The Low Coefficient of Friction works well in this application so that the wrapping material slides effortlessly and without any hang-ups over the roll tensioner's surface, even under load. The pressure sensitive adhesive backer 216 applied to the roll tensioner is of an adequate strength to permanently attach to the box and hold the roll tensioner 221 to the box while bent into the fully installed position and remain attached for continuous use as roll material is removed and the diameter of the roll material is reduced or replaced.

Figure 5:
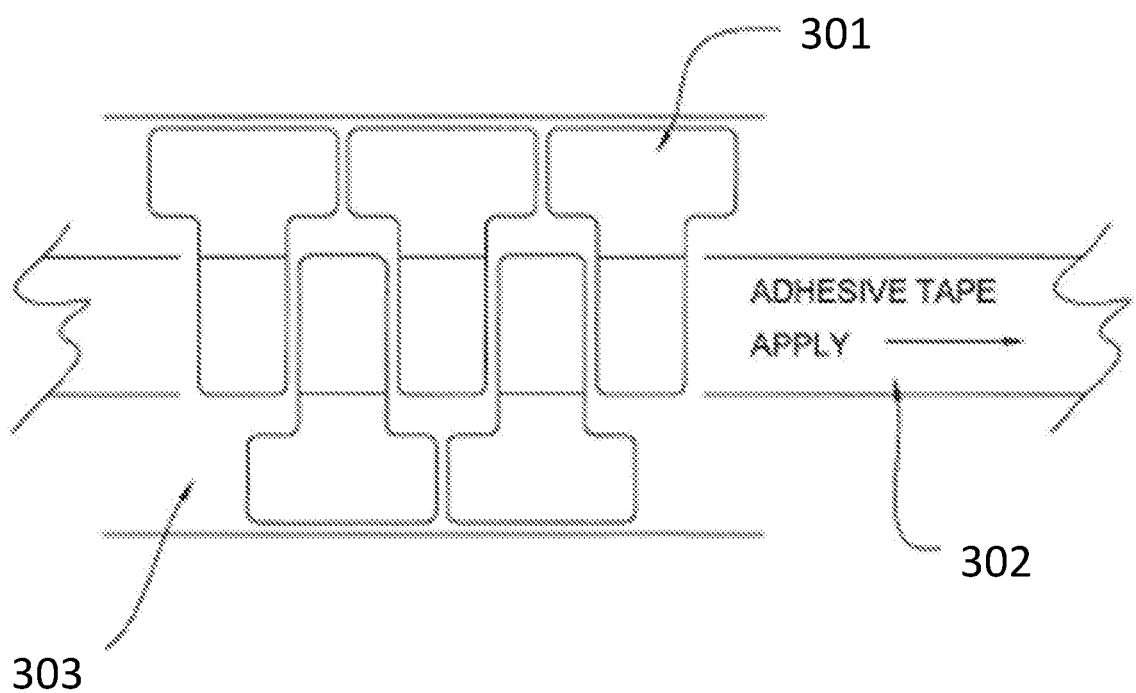
FIG. 5 illustrates a process for manufacturing an embodiment of the roll tensioner.

Referring to FIG. 5, a method of making or manufacturing the roll tensioner is proposed. The roll tensioner may be formed in sheets of material (such as PVC) through die stamping with application of adhesive tape with a peel backing. It is recognized that tooling would be required for sheet or strip forming as well as die stamping and adhesive tape application (not necessarily in this order). Extruded sheets or strips of thermoplastic material, such as PVC, are die cut or die stamped into the required shape, herein shown at 301. Various manufacturing methods to accomplish this exist and may be used. Shapes 301 would be nested in an alternating pattern allowing the adhesive tape 302 to be applied in a continuous fashion (with backer attached) across alternating nested shapes, correctly positioned to cover all parts. The parts would then be removed from the main carrier sheet 303 leaving behind any excess material that is not needed. This excess material may be ground up and recycled.

Figure 6A:
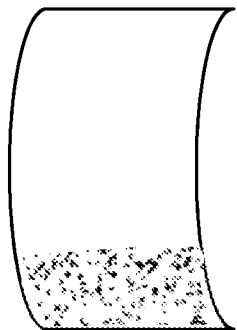
FIG. 6a illustrates an alternative embodiment of the subject roll tensioner shaped as a polygon.
Figure 6B:
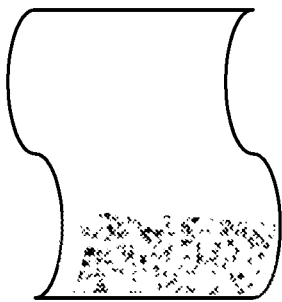
FIG. 6b illustrates an alternative embodiment of the subject roll tensioner shaped as a quadrilateral with at least one pair of parallel sides.
Figure 6C:
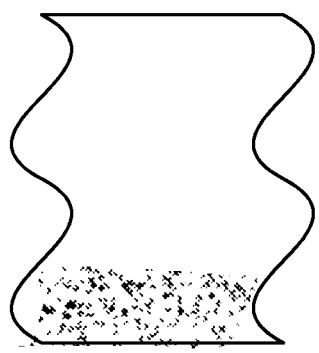
FIG. 6c illustrates an alternative embodiment of the subject roll tensioner shaped as a quadrilateral with at least one pair of parallel sides.
Figure 6D:
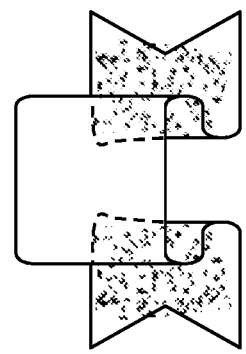
FIG. 6d illustrates an alternative embodiment of the subject roll tensioner shaped as a capital "U" wherein both the distal end and the proximal end include adhesive on the first side, so that that spring back reversion section is a flexible "U" shaped configuration.
Figure 6E:
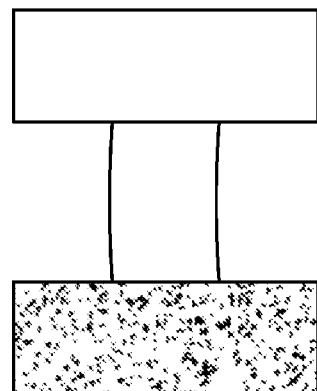
FIG. 6e illustrates an alternative embodiment of the subject roll tensioner shaped as a capital "I"

Referring to FIGS. 6*a*-6*e*, various alternative shaped configurations of the subject roll tensioner are shown. FIG. 6*a* illustrates an alternative embodiment of the subject roll tensioner shaped as a polygon. FIG. 6*b* illustrates an alternative embodiment of the subject roll tensioner shaped as a quadrilateral with at least one pair of parallel sides. FIG. 6*c* illustrates an alternative embodiment of the subject roll tensioner shaped as a quadrilateral with at least one pair of parallel sides. FIG. 6*d* illustrates an alternative embodiment of the subject roll tensioner shaped as a capital "U" wherein both the distal end and the proximal end include adhesive on the first side, so that that spring back reversion section is a flexible "U" shaped configuration that presses against the wrapping material roll cut edge. However, it has been found that this is not the preferred embodiment because it does not provide a free edge for following and guiding the wrapping material edge as with the other embodiments illustrated in FIGS. 6*a-c* and *e*. FIG. 6*e* illustrates an alternative embodiment of the subject roll tensioner shaped as a capital "I". In each illustration, the proximal end section is formed having a first side with a permanent adhesive applied, shown in the shaded region or regions (via FIG. 6*d*).

Figure 7A:
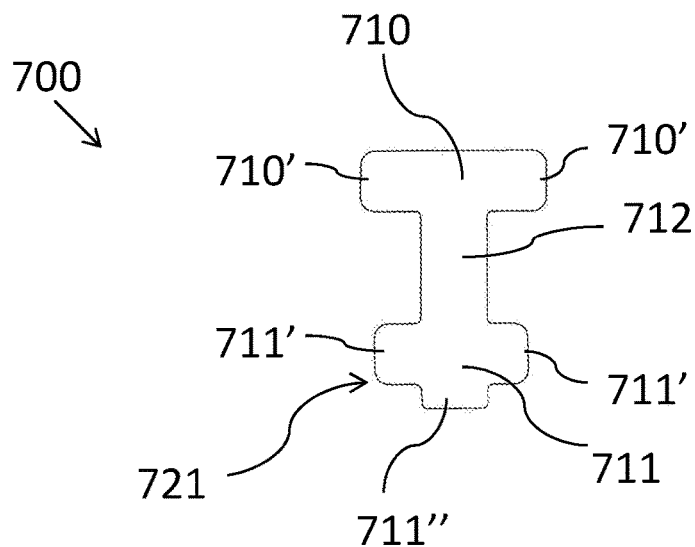
FIG. 7a illustrates a top plan view of another embodiment of the roll tensioner.
Figure 7B:
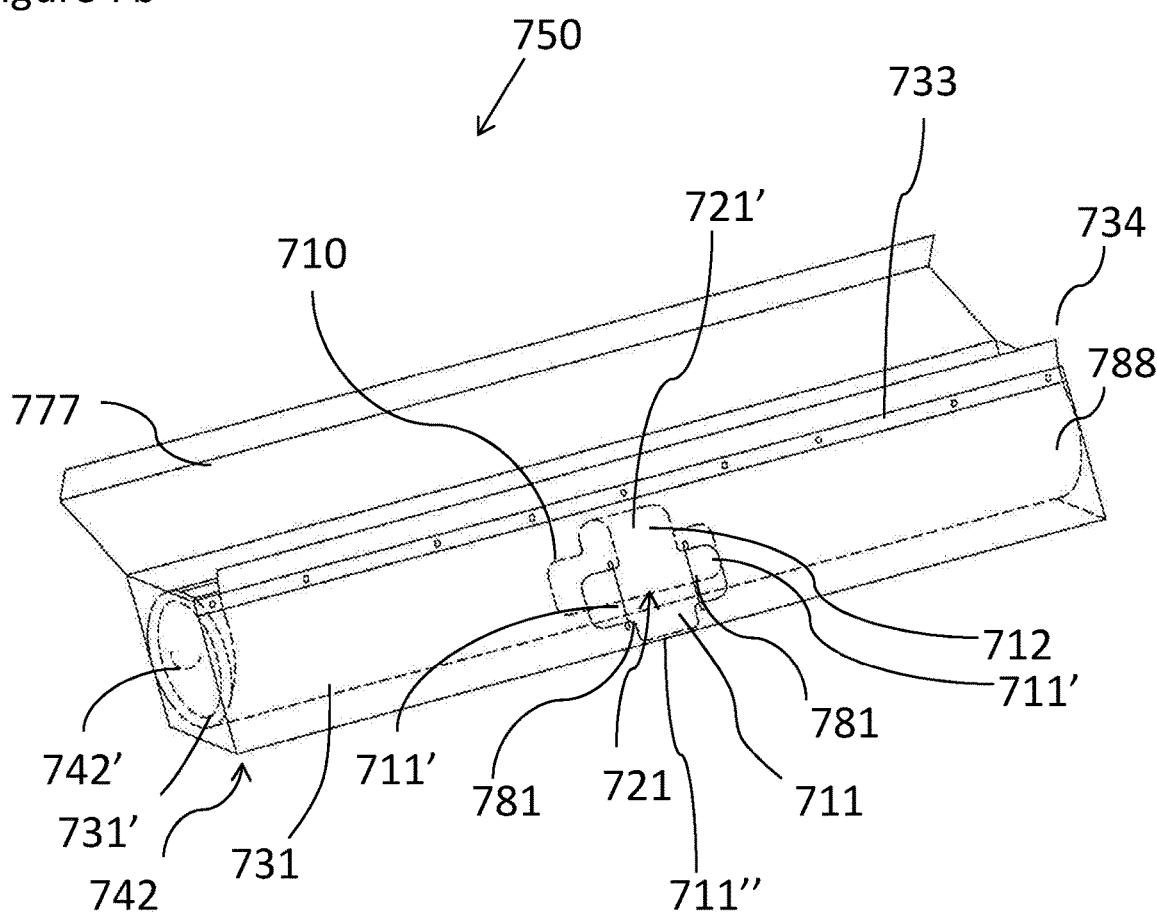
FIG. 7b illustrates a front top plan view of a wrapping material box with the roll tensioner embodiment of FIG. 7a inserted therein and the box lid open.
Figure 7C:
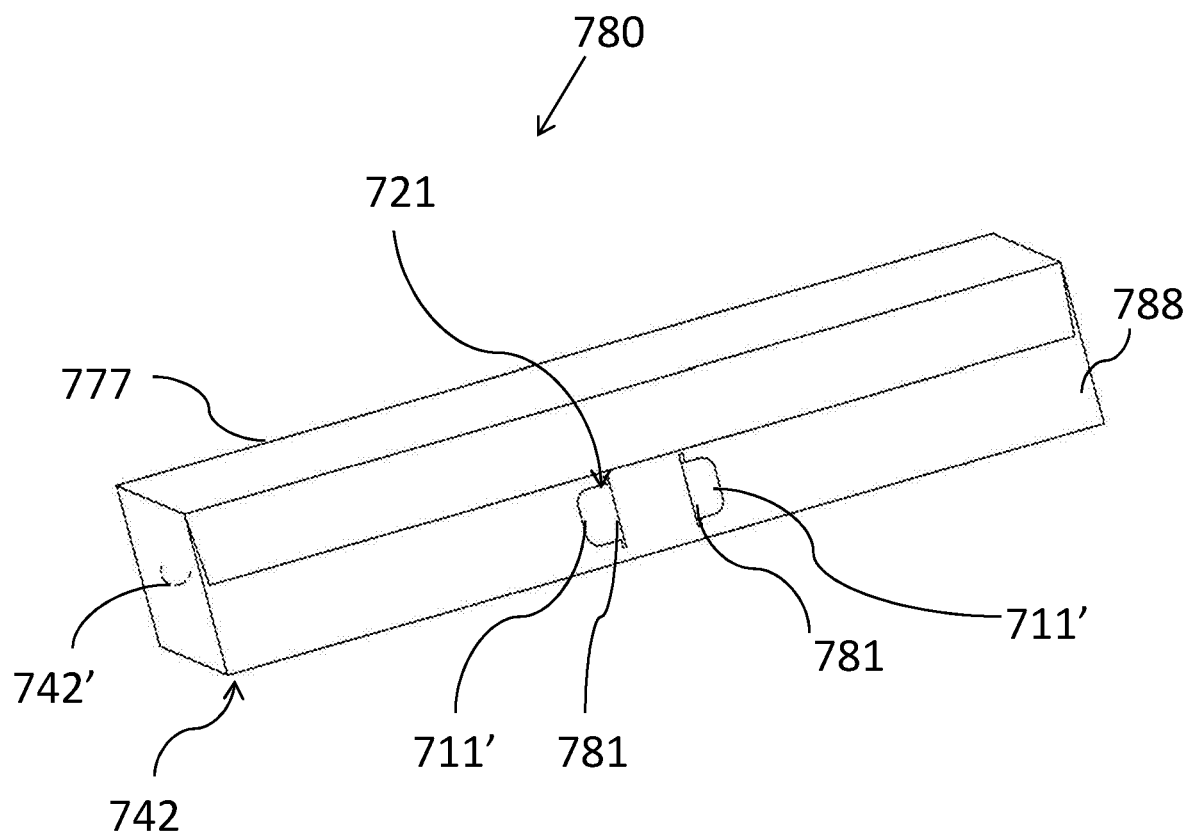
FIG. 7c illustrates a front top plan view of the wrapping material box with the roll tensioner embodiment of FIG. 7a inserted therein and the box lid closed.

FIG. 7*a* illustrates another embodiment of the roll tensioner, shown generally at 700. FIG. 7*b* illustrates a front top plan view of a wrapping material box, shown generally at 750, with the roll tensioner embodiment of FIG. 7*a* inserted therein and the box lid open. FIG. 7*c* illustrates a top plan view of the wrapping material box, shown generally at 780, with the roll tensioner embodiment of FIG. 7*a* inserted therein and the box lid closed.

Referring to FIGS. 7*a*-7*c*, in this embodiment the roll tensioner 721 is constructed having distal and proximal end sections, 710 and 711, separated by a spring back/reversion section 712. Proximal end section 711 includes opposing bottom tabs 711' and center bottom tab 711" (for stability) adapted to secure the tensioner 721 in place within a wrapping material box 742. Distal end 710 is adapted to extend downward via spring back/reversion section 712 in the interior of box 742 when a force is applied (i.e. the wrapping material roll). Preferably the distal end 710 includes opposing top tabs 710' forming a "T" distal end section thereby providing greater surface area for abutting a wrapping material end 734 or the area proximate thereto.

Roll tensioner 721 is attached within the wrapping material box 742 acting as packaging, and as a dispenser for a wrapping material roll having a wrapping material 731 spooled on a tube (or core) 731'. The box 742/packaging/dispenser, preferably contains an attached metal strip 733 (metal cutter strip) with a jagged edge yielding the wrapping material end 734. The conventional household box 742 may also contain perforated tabs 742' on each end of the box 742 which can be used by the end user, to retain the wrapping material roll within the box 742.

Figure 8:
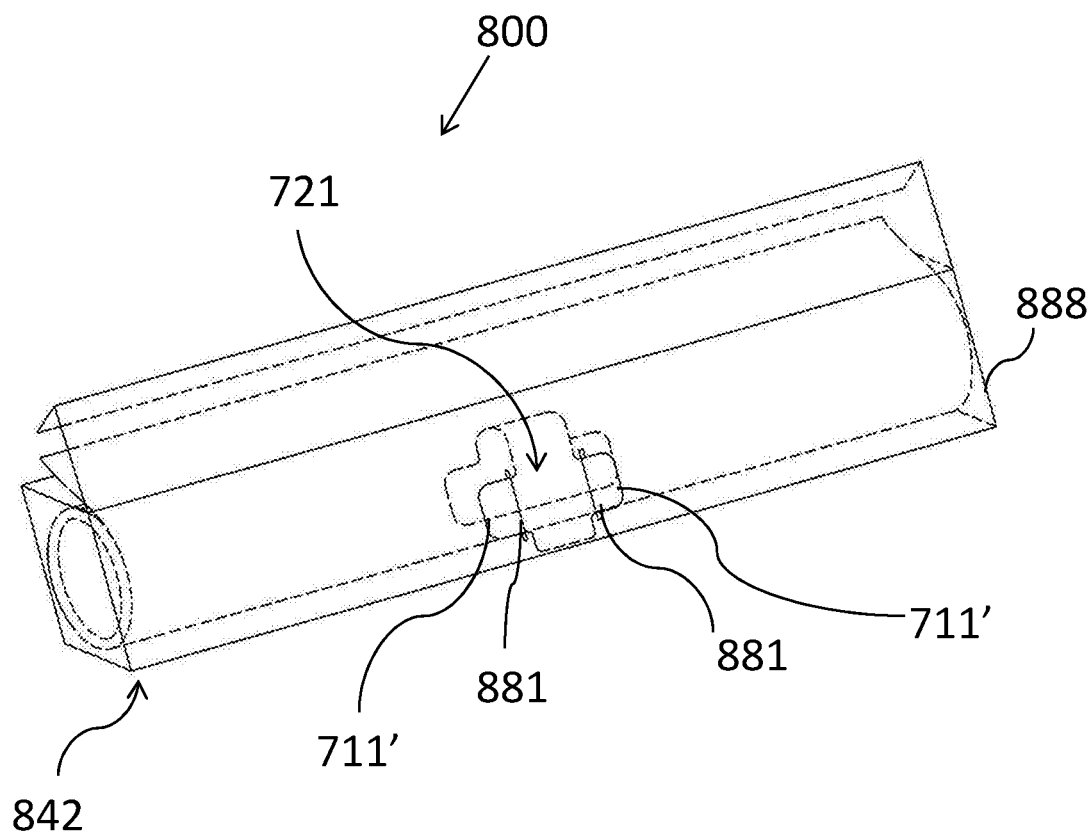
FIG. 8 illustrates the embodiment of the roll tensioner of FIG. 7a with attachment on the rear of a box rather than in the front of the box.

In this embodiment, roll tensioner 721 has no attachment means, i.e. no adhesive tape, but does require two vertical slots 781 in either the front or rear vertical wall of box, herein shown in the front vertical wall 788 (see FIG. 8, showing rear vertical wall of box configuration) for receiving opposing bottom tabs 711'. The bottom tabs 711' of the tensioner 721 flex and weave through the box slots 781, from within the box 742, to secure the tensioner 721 in place. The tensioner 721 is held correctly in position while under load from the wrapping material 731 and is prevented from being pulled up and out of the box 742 because the bottom tabs 711' prevent up and down movement once weaved through the slots 781. Slots 781 would also be helpful in correctly setting the position of the tensioner 721 in relation to the wrapping material 731. With an adhesive tape application, there is always a risk of the tensioner being slightly out of proper alignment or off the correct position. However, in this embodiment there is no adhesive tape application and instead the tensioner is secured by way of the mating bottom tabs 711' and slots 781 in the box 742 to set the position of the tensioner 721. If the slots 781 are not vertical, or are off center, then the tensioner 721 will also be off. This embodiment will not affect the box's 742 lid 777 from closing, as the top lip of the box 742 would be above the tabs 711'. See FIG. 7*c* showing the box 742 with the lid 777 closed.

The roll tensioner 721 is mechanically bent over as shown at 721' owing to the spring back/reversion section 712 as the wrapping material 731 roll is placed into the box 742, setting the roll tensioner 721 into the correct position so that the wrapping material end 734 rests upward and away from the front box 742 wall 788, thereby creating a gap between the wall 788 and the roll of wrapping material end 734. This makes it easier to grab the wrapping material end 734.

FIG. 8 illustrates the embodiment of the roll tensioner of FIG. 7*a* with attachment on the rear of the box rather than in the front of the box, as in FIG. 7*b*. Other than the location of slots 881, the configurations of the tensioner and the box are the same. In this embodiment, roll tensioner 721 is constructed as set forth in regards to FIG. 7*a*, but the box's 842 two vertical slots 881 are shown on the rear vertical wall 888 of box 842 for receiving the opposing bottom tabs 711' of tensioner 721. The bottom tabs 711' of the tensioner 721 flex and weave through the box slots 881, from within the box 842, to secure the tensioner 721 in place.

Alternative features of the subject invention are contemplated and non-limiting including, for example: the roll tensioner may be constructed in a plethora of shapes and sizes, and from a plethora of materials and colors; etc. These features are contemplated in combination with the main embodiments shown in the Figures.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A roll tensioner for use in maintaining a wrapping material cut edge of a wrapping material retained on a wrapping material roll located within a wrapping material box having an interior cavity with an interior front wall having a top cutting edge, said roll tensioner comprising:
   a. a thin, flexible main body having distal and proximal end sections separated by a spring back reversion section, and formed having a first side and a second side;
   b. attachment means located on at least a portion of said proximal end section on said first side, said attachment means adapted to attach said proximal end section to said interior front wall of said wrapping material box; said proximal end section comprises opposing bottom tabs adapted to mate with slots located within a wall of said wrapping material box to secure said roll tensioner in place therein, and wherein said distal end comprises opposing top tabs forming a "T" shaped distal end section;
   c. said spring back reversion section being composed of a material that has an immediate elastic response to a static load and being capable of full recovery substantially immediately when said static load is removed;
   d. said distal end mechanically bending downwardly owing to said spring back reversion section in said interior cavity of said wrapping material box;
   whereby said distal end section is adapted to rest against said wrapping material proximal to said wrapping material cut edge to retain said wrapping material cut edge in an upward, substantially parallel position to said interior front wall of said wrapping material box for easy grasping of said wrapping material cut edge by an end user.

2. The roll tensioner as recited by claim 1, wherein the tensioner is composed of PVC and has an elastic modulus ranging from 1500 to 3,000 MPa.

3. The roll tensioner as recited by claim 1, wherein said tensioner is composed of a flexible clear material.

4. The roll tensioner as recited by claim 1, wherein said tensioner has a rectangular shape.

5. The roll tensioner as recited by claim 1, wherein said tensioner is composed of polyester.

6. The roll tensioner as recited by claim 1, wherein said tensioner is composed of Nylon.

7. The roll tensioner as recited by claim 1, wherein said wrapping material is composed of a material selected from the group of wrapping paper, aluminum foil, wax paper, freezer paper, parchment paper, deli wrap and paperboard.

8. The roll tensioner as recited by claim 1, wherein said tensioner is composed of a low-coefficient of friction material.

9. The roll tensioner as recited by claim 1, wherein said tensioner is shaped as a quadrilateral with at least one pair of parallel sides.

10. The roll tensioner as recited by claim 1, wherein said tensioner has a polygonal shape.

* * * * *